United States Patent
Mori

(10) Patent No.: US 6,994,119 B2
(45) Date of Patent: Feb. 7, 2006

(54) FIBER REINFORCED HOSE

(75) Inventor: Hiroyoshi Mori, Iwakura (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 210 days.

(21) Appl. No.: 10/733,427

(22) Filed: Dec. 10, 2003

(65) Prior Publication Data

US 2004/0226624 A1 Nov. 18, 2004

(30) Foreign Application Priority Data

May 12, 2003 (JP) .............................. 2003-132781

(51) Int. Cl.
*F16L 11/10* (2006.01)

(52) U.S. Cl. ...................... 138/126; 138/123; 138/124; 138/125; 428/36.2; 428/36.8; 428/36.9

(58) Field of Classification Search ........ 138/123–126; 428/36.2, 36.8, 36.9
See application file for complete search history.

(56) References Cited

U.S. PATENT DOCUMENTS

| 3,723,239 | A | * | 3/1973 | Takemura et al. | ....... 428/477.4 |
| 3,905,398 | A | * | 9/1975 | Johansen et al. | ........... 138/124 |
| 4,343,333 | A | * | 8/1982 | Keister | ........................ 138/125 |
| 4,802,510 | A | * | 2/1989 | Berlincourt et al. | ........ 138/125 |
| 6,158,476 | A | * | 12/2000 | Sjotun | ........................ 138/126 |
| 6,408,890 | B1 | | 6/2002 | Mori | ........................... 138/126 |
| 6,435,217 | B1 | * | 8/2002 | Bertero et al. | .............. 138/126 |

FOREIGN PATENT DOCUMENTS

JP 2000-18444 1/2000

OTHER PUBLICATIONS

Database WP1, Section Ch, Week 199346, Derwent Publications Ltd., London, GB, AN 1993-65928, XP-002291616.
Patent Abstracts of Japan for JP05-272667 published on Oct. 19, 1993.
European Search Report for EP 03 02 8290 dated Aug. 9, 2004.
Patent Abstracts of Japan for JP2000-018444 published on Jan. 18, 2000.
Patent Abstracts of Japan for JP04-046286 published on Feb. 17, 1992.

* cited by examiner

*Primary Examiner*—Patrick Brinson
(74) *Attorney, Agent, or Firm*—Darby & Darby

(57) ABSTRACT

A flexible fiber inforced hose comprises an inner rubber layer, an outer rubber layer, and a fiber reinforced layer provided between the inner rubber layer and the outer rubber layer, wherein the fiber reinforced layer is constructed by using a reinforcing fiber of at least one raw yarn, which is a spanized yarn consisting of monofilaments made of a para aromatic polyamide material. Such a fiber reinforced hose has excellent heat resistance, tensile strength, and adhesiveness with the rubber layers, as well as durability against repetitive pressurizations.

16 Claims, No Drawings

FIBER REINFORCED HOSE

BACKGROUND OF THE INVENTION

1. Field of the Invention

The invention relates to a fiber reinforced hose. More specifically, the invention relates to improvements of durability of fiber reinforced hoses used for high temperature applications.

2. Description of the Related Art

Fiber reinforced hoses with a fiber reinforced layer are conventionally used. In case of a fiber reinforced hose for the circulatory system of liquid line with a low to medium operating pressure of 30 kPa to 2 MPa (maximum pressure: 150 kPa to 4 MPa) and operating temperature of 120° C. or less (maximum 150° C.), reinforcing fibers made of polyethylene terephthalate (PET) and aliphatic polyamide (nylon) are normally used.

In accordance with the increase of environmental temperatures inside the automobile engine compartment, demands for the thermal resistance of hoses are ever increasing. As a result, more materials with better heat resistance have come to be used as the rubber materials for hose, while reinforcing fibers made of aromatic polyamide with excellent heat resistance (aramid fibers) are often used.

For example, JP 3077169 and JP-A-2000-18444 disclose composite hoses or media transporting hoses having fiber reinforced layers using fibers made of PET, nylon, aramid or Kevlar™ (a trade name of aromatic polyamide) fibers.

It is well known that there are many types of reinforcing fibers. A fiber consisting of a combination of multiple monofilaments that are twisted is called a filament fiber. A filament fiber can be exemplified by a combination of 1000–2000 long single fibers of 0.5–2.0 denier twisted together. A spanized yarn is produced by bundling many monofilaments, stretching-breaking the monofilaments to a length of approximately 60 cm at an arbitrary position of each monofilament by applying a tensile force with a certain processing mechanism, and twisting thus obtained monofilaments together. A staple yarn is produced by twisting a group of fibers pulled out of a mass of monofilaments. Both spanized yarns and staple yarns are fibers with much fluff.

As can be easily seen from the above characteristics, the filament yarn generally has a large tensile strength. This means that it provides a high pressure resistance when it is used in a fiber reinforced layer of a hose. However, since the filament yarn has no fluff, it causes insufficient adherence with the rubber layers when it is used as a fiber reinforced layer. On the contrary, a fiber reinforced layer of spanized yarns or staple yarns with much fluff provides an excellent anchoring effect against the adjacent rubber layers, resulting in a good adhesiveness to the rubber layers. However, in order to use staple yarns as the reinforcing fibers of a hose, it is necessary to use yarns of a higher denier, i.e., to make the yarns thicker, in order to obtain a high pressure resistance. Therefore, the use of the staple yarn is not preferable due to a cost increase. The spanized yarn is suitable as the reinforcing fiber for the fiber reinforced hose, because it provides a good tensile strength as well, as can be seen from the production process described above.

SUMMARY OF THE INVENTION

The fiber materials of aromatic polyamide can be divided into the meta and para groups. The meta group polyamides are aromatic polyamides consisting of monomers with chemical structures having substituents on the meta positions of the aromatic ring. The para group polyamides are aromatic polyamides consisting of monomers with chemical structures having substituents on the para positions of the aromatic ring. A research by the inventor of the present invention has revealed that the spanized yarn consisting of the monofilaments of the para group shows a far superior tensile strength than that of the spanized yarn consisting of the meta group monofilaments. Therefore, the fiber reinforced layer consisting of spanized yarns made of para group monofilaments is expected to provide not only a good heat resistance and a good adhesiveness with the rubber layers, but also a high pressure resistance of the fiber reinforced hose due to the high tensile strength of the reinforcing fibers.

Spanized yarn consisting of monofilaments made of a para aromatic polyamide material shows a poor abrasion resistance when the spanized yarn is twisted conventionally. The fiber reinforced hose is subjected to repetitive dynamic pressurizations due to fluctuations of the fluid pressure. As a result, severe abrasions occur between the reinforcing fibers in the fiber reinforced layer. Despite the fact that the spanized yarn consisting of monofilaments made of a para group aromatic polyamide material has the aforementioned advantages, it tends to be worn out easily because of its severe abrasions, which may cause a substantial drop of the pressure resistance of the hose.

Abrasion resistance can be substantially improved by improving the twisting of the spanized yarn consisting of monofilaments made of a para group aromatic polyamide material. Specifically, the abrasive resistance can be much improved by increasing the "twisting multiplier" of the spanized yarn from 1.0–1.2 of the conventional filament yarn to a much higher value such as 2–6. The twisting multiplier has the specific meaning, which will be described later.

A flexible fiber reinforced hose includes an inner rubber layer, an outer rubber layer, and a fiber reinforced layer provided between said inner rubber and outer rubber layers, wherein said fiber reinforced layer is constructed by using a reinforcing fiber of at least one raw yarn, which is a spanized yarn consisting of monofilaments made of a para group aromatic polyamide material.

The reinforcing fiber is a fiber used in the construction of the fiber reinforced layer. The reinforcing fiber can be either a single raw yarn (single twisted cord), or a twisted pair of raw yarns (twisted two ply cords). The reinforcing fiber may be a group of three or more raw yarns twisted together. The raw yarn that constitutes a reinforcing fiber is a bundle of a large number of monofilaments twisted together.

The raw yarn is in a form of a spanized yarn, which is a large number of monofilaments stretch-broken at an arbitrary position to produce a length of approximately 60 cm and twisted together. In the spanized yarn, the edges of stretch-broken monofilaments form fluffing of fibers around the yarn. Although the staple yarn also accompanies fluffing of fibers, its tensile strength is substantially less than that of the spanized yarn as the production process and the constitution of the fibers are different.

In this aspect of the invention, "the reinforcing fiber using at least one raw yarn" includes the reinforcing fiber consisting of a single raw yarn (i.e., single twisted cord) having the abovementioned constitution, and the reinforcing fiber consisting of two raw yarns (i.e. twisted two ply cord) or three or more raw yarns, at least one of the raw yarns having the abovementioned constitution.

According to this aspect, the fiber reinforced layer of reinforcing fibers made of the para aromatic group polyamide exhibits excellent heat resistance and good adhesiveness between the fiber reinforced layer and the rubber layer as the raw yarn consists of spanized yarn. Moreover, since the spanized yarn consists of monofilaments of the para aromatic group polyamide material, it has a tensile strength much higher than that of the spanized yarn consisting of monofilaments made of a meta aromatic polyamide material.

In another aspect of the present invention, the twisting multiplier of the raw yarn, which is the spanized yarn according to the first aspect, is in a range of 2–6.

The "twisting multiplier" in the second aspect is the factor X represented by the following formula 1, wherein the "twisting number" is the number of twists of a large number of monofilaments that constitute the raw yarn. In other words, the twisting number (so-called "first ply") of a large number of monofilaments of the raw yarn in the formula 1 applies to any of a reinforcing fiber consisting of a single twisted cord, a reinforcing fiber consisting of a twisted two ply cord, or a reinforcing fiber consisting of three or more raw yarns. In other words, the "twisting number" and the "twisting multiplier" in the formula 1 are not dependent on the twisting number in twisting the raw yarns (so-called "second ply") in the twisted two ply cord and the like, or the twisting multiplier calculated based on said twisting number. This fact has been proven by an actual example to be described later.

$$X = \{\text{Twisting Number(turns/m)} \times \sqrt{\text{denier}}\}/2880 \qquad \text{Formula 1}$$

In the above formula 1, the denominator 2880 is an empirical constant. Of the numerator, "turns/m" is the number of twist turns per 1 meter of a large number of monofilaments that constitute the reinforcing yarn, and is not the twist number in the twisting of raw yarns in the twisted two ply cord, etc. The item shown in the square root symbol of the numerator is the square root of the twisting number of the reinforcing yarn.

Because the spanized yarn with a twisting multiplier in the range of 2–6 is used as the raw yarn, the abrasion resistance of the fiber reinforced layer is much improved in this aspect of the invention. Consequently, the fiber reinforced hose thus produced provides an excellent pressure resistance for a long period of use against repetitive dynamic pressurization. If the twisting multiplier of the raw yarn is less than 2, the improvement effect of the abrasion resistance of the fiber reinforced layer will not be sufficient. Moreover, unexpectedly, the improvement effect of the abrasion resistance of the fiber reinforced layer is not related linearly with the twisting multiplier of the raw yarn, and there are significant points in the twisting multiplier range of 2–6, and the effect of improvement in the abrasion resistance will not be sufficient when the twisting multiplier is over 6.

In addition to the above, it has also been found that the insertion resistance of a pipe into the hose is reduced when the spanized yarn with the twisting multiplier in the range of 2–6 is used. Moreover, the withdrawing resistance of the pipe from the hose is not reduced in this case. A certain amount of release of twist occurs in the spanized yarn during the pipe insertion and the same release of twist does not occur in withdrawing the pipe from the hose, but this alone does not clarify the reason why this effect is more prominent in the twisting multiplier range of 2–6.

In yet another aspect of the present invention, the raw yarn of the fiber reinforced layer used in the above aspect exhibits a tensile strength of 14 cN/denier or more in the tensile test according to the JIS L 1013 standard.

When the raw yarn used in the fiber reinforced layer of the fiber reinforced hose shows the tensile strength specified in the above aspect, the desirable level of the pressure resistance can be achieved in the fiber reinforced hose. Such a tensile strength is considered generally achievable when the spanized yarn consisting of monofilaments made of a para aromatic group polyamide material is used.

In further aspect of the present invention, a fiber reinforced layer used in the above aspects consists of spiral wound, braided or knitted reinforcing fibers.

The construction of the reinforcing fibers of the fiber reinforced layer of the fiber reinforced hose in the present invention is not limited, but can be of any known construction. Spiral winding, braiding and knitting are preferred as exemplified in the further aspect.

In another aspect of the present invention, the fiber reinforced hose according to any of the previous aspects is a hose for an air conditioner, engine cooling hose, heater hose, oil hose or air hose for automobiles or industrial machines.

The application of the fiber reinforced hose according to this invention is not limited. However, it is most suitable for an application where heat resistance and a certain pressure resistance are required, such as a hose for an air conditioner, engine cooling hose, heater hose, oil hose or air hose for automobiles or industrial machines, as exemplified by the fifth embodiment.

The above and other advantages of the invention will become more apparent in the following description.

DETAILED DESCRIPTION OF THE INVENTION

The fiber reinforced hose according to the present invention is a flexible fiber reinforced hose having an inner rubber layer, an outer rubber layer, and a fiber reinforced layer provided between the inner and outer rubber layers. The fiber reinforced layer is constructed by using a reinforcing fiber of at least one raw yarn, which is a spanized yarn consisting of monofilaments made of a para aromatic polyamide material. The inner rubber layer and/or the outer rubber layer may be a single rubber layer or a plurality of rubber layers.

In the fiber reinforced hose of the present invention, the fiber reinforced layer provided between the inner and outer rubber layers is most preferably be sandwiched between the inner and outer rubber layers contacting with them directly. The fiber reinforced layer can be constituted in two or more number of layers via, e.g., intermediate rubber layer(s).

The kind of rubber material that constitutes the inner rubber layer and/or the outer rubber layer is not limited.

The fiber reinforced hose may include an arbitrary hose component at any laminating position of the hose in addition to said inner rubber layer, outer rubber layer, and fiber reinforced layer. An example of such an arbitrary hose component is a resin layer. Other examples include a fluid barrier layer made of a metal thin film or metal foil lamination layer. For example, the fiber reinforced hose may comprise a fluid barrier layer, an inner rubber layer, a fiber reinforced layer, and an outer rubber layer from the innermost to the outermost layer. It is also possible to include a rubber layer at any arbitrary laminating position in addition to said inner and outer rubber layers sandwiching the fiber reinforced layer.

The fiber reinforced hose of the present invention can be used for arbitrary applications. More preferably, it can be used for applications where heat resistance and a certain pressure resistance are required such as engine cooling hoses, heater hoses, oil hoses, air hoses and the like for automobiles and for general industrial machines such as power shovels, rice planting machines, combines, and so on.

The fiber reinforced layer is constituted as an arbitrary construction using the reinforcing fibers to be described later. In this invention, spiral winding, braiding, and knitting are integrally called as the "construction" of reinforcing fibers with reference to the fiber reinforced layer.

In the construction format of braiding or spiral winding, the braiding angle and pitch are not limited but rather can be arbitrarily designed. The construction format in the knitting is not limited.

The raw yarn used as the reinforcing fiber that constitutes the fiber reinforced layer is the spanized yarn consisting of monofilaments made of a para aromatic polyamide material. The product names of the para aromatic polyamide materials that can be used for the invention include Kevlar™ by DuPont, Twaron™ by Teijin Twaron, and Technora™ by Teijin.

As can be seen from the above, a large number of combined monofilaments is processed according to a specified method to form a spanized yarn, which is the raw yarn. This raw yarn is then used to constitute a reinforcing fiber. The reinforcing fiber of the present invention can be a single twisted cord consisting of a single yarn, a twisted two ply cord consisting of two twisted raw yarns, or the same consisting of three or more twisted raw yarns.

The reinforcing fiber consists of raw yarns of said spanized yarns with twisting multipliers according to said formula 1 ranging in 2–6. The twisting multiplier in the present invention is, as mentioned before, defined according to the twisting number and denier of the monofilament in the raw yarn. Therefore, it does not depend on the twisting number for twisting a pair of raw yarns in the reinforcing fiber, i.e., a twisted two ply cord. The twisting number of raw yarns themselves as in twisted two ply cords can be arbitrarily set up as needed.

The twisting number and denier of the monofilament in the raw yarn is not limited as long as the twisting multiplier according to the definition of the formula 1 is within 2–6, but preferably the twisting number of monofilament should be approximately 80–1000 turns/m and the denier be 300–1000 denier.

Interestingly, in case of the reinforcing fiber consisting of two or more raw yarns, if at least one of the raw yarn satisfies the twisting multiplier as specified in the formula 1, the improvement effect of the abrasion resistance of the fiber reinforced layer will be close to that of a case where all the raw yarns satisfy the twisting multiplier as specified in the formula 1. Therefore, the statement in the first aspect that "using at least one raw yarn with a twisting multiplier ranging in 2–6" means "using a reinforcing fiber containing at least one raw yarn with a twisting multiplier ranging in 2–6."

In order to provide a necessary pressure resistance to the reinforcing fiber, the reinforcing fiber should have a tensile strength over a certain degree. The strength should preferably be 14 cN/denier or higher in the tensile test according to the JIS L 1013, or more preferably be 16 cN/denier or higher in the same tensile test. Such a tensile strength is considered a generally achievable characteristic for a spanized yarn consisting of monofilaments made of a para aromatic group polyamide material.

A reinforcing fiber not having a tensile strength over a certain degree stated above will not be able to provide a sufficient pressure resistance. A reinforcing fiber consisting of monofilaments made of a para or meta aromatic polyamide material showing sufficient fiber fluffing, but failing to show the abovementioned tensile strength, is considered to be a staple yarn.

Embodiments

Making Fiber Reinforced Hoses

Fiber reinforced hoses of the following Examples 1 through 14 as well as a Comparative Example 1 shown in Table 1 through Table 3 were made using the processes shown below. The fiber reinforced hose in each case has an inner diameter of 9 mm and an outer diameter of 17 mm as shown in the "Inner diameter x outer diameter (mm)" column of Table 1 through Table 3.

First, an acrylic rubber composite according to the following compositions is extruded to form an inner unvulcanized rubber layer with a wall thickness of 2 mm.

Acrylic Rubber Composition

| | |
|---|---|
| Acrylic rubber | 100 weight parts |
| Stearic acid | 1 weight part |
| Anti-oxide | 2 weight parts |
| FEF carbon | 55 weight parts |
| Plasticizer DOP | 10 weight parts |
| Paraffin wax | 2 weight parts |
| Crosslinking agent | 2 weight parts |

In the above compositions, Nipol AR42 by Nippon Zeon Co., Ltd. was used as the acrylic rubber, Nocrac CD by Ouchi Shinko Chemical Industrial Co., Ltd. was used as the anti oxidant, and Vulnoc AB by Ouchi Shinko Chemical Industrial Co., Ltd. was used as the crosslinking agent.

Next, the reinforcing fibers spirally wound with an angle θ of 54° 44' were added to the unvulcanized inner rubber layer to form a fiber reinforced layer in each case. The "Yarn type" in Table 1 through Table 3 shows the material and the type of yarn (spanized yarn, filament yarn, etc.) for the reinforcing fiber in each example.

The "Denier" section of Table 1 through Table 3 shows the denier number and the distinction between single twisted cord or twisted two ply cord for the reinforcing fiber in each example. In case of the twisted two ply cord, the denier number of the two raw yarns (shown as "single twisted cord" in the tables) that constitute the twisted two ply cord is also shown. The "Twist number (turns/m)/twist multiplier" section shows the twist number and the twist multiplier. In case the reinforcing fiber is a single twisted cord, the twisting number and the twisting multiplier are shown in the First ply (single twisted cord) subsection, while in case the reinforcing fiber is a twisted two ply cord, the twisting number and the twisting multiplier of each raw yarn are shown in the First ply (single twisted cord) subsection as well as the twisting number and the twisting multiplier as a twisted two ply cord as a whole in the Second ply (twisted two ply cord) subsection. As mentioned before, even in case the reinforcing fiber is a twisted two ply cord, the twisting number and the twisting multiplier that are shown in the First ply (single twisted cord) subsection are important.

The "Tensile strength" section of Table 1 through Table 3 shows the tensile strength for a single raw yarn in its "N/fiber" subsection and the tensile strength per denier in the "cN/denier" subsection for the reinforcing yarn used in each case. Furthermore, "Braiding number" section of the tables show the braiding number of the reinforcing fiber used in the fiber reinforced layer for each case.

After forming the fiber reinforced layer in each case as mentioned above, an acrylic rubber composite with the same composition as said rubber inner layer is extruded to form an unvulcanized rubber outer layer with a thickness of 2 mm, thus completing a fiber reinforced hose in an unvulcanized status.

Next, each of these fiber reinforced hoses in the unvulcanized status are cut to a length of 300 mm, a metal mandrel with an outer diameter of 9 mm is inserted in it. After having vulcanized each of these pipes at the same appropriate condition, the metal mandrels are removed to complete the process of making each example fiber reinforced hose.

Evaluation of the Fiber Reinforced Hoses

On each example fiber reinforced hose, the evaluations are conducted on the following three items: (1) peeling strength, (2) initial bursting pressure, and (3) impulse test. Since the impulse test on Comparative Example 1 is meaningless, the test was not conducted.

(1) Peeling strength: The peeling strength was evaluated based on the JASO M 319 6.4.2 (1). This evaluation test was conducted on ring-shaped specimens produced by cutting each example fiber reinforced hose to a length of 25.0±0.5 mm. The evaluation results are shown in the "Peeling strength (N/25 mm)" section of Table 1 through Table 3.

(2) Initial bursting pressure: The initial bursting pressure was evaluated based on the JASO M 319 6.1.2 (2). The evaluation results are shown in the "Initial bursting pressure (MPa)" section of Table 1 through Table 3. The initial bursting pressure is believed to reflect the strength of the fiber reinforced layer in a fiber reinforced hose.

(3) Impulse test: The impulse test was conducted based on JASO M 319 6.10.2 (1). In conducting the test, two kinds of testing conditions, condition A and condition B are established. Condition A is to apply 300,000 pressure cycles, each cycle consisting of 4 seconds of no pressure and two seconds of 0.4 MPa pressure, at the oil temperature and ambient air temperature of 135° C. Condition B is to apply 200,000 pressure cycles, each cycle consisting of 4 seconds of no pressure and two seconds of 0.8 MPa pressure, at the oil temperature and ambient air temperature of 135° C.

As to the impulse test under the condition A, the occurrence of abnormality of "Hose rupture due to yarn breakage of reinforcing fibers" is shown in the "Test result" subsection of Table 1 through Table 3. The relict bursting pressure (MPa) measured after the impulse test based on JASO M 319 6.1.2 (2) is also indicated. Furthermore, the bursting pressure reduction rate (%) in comparison with the initial bursting pressure is shown in parentheses.

The results of the impulse test under the condition B are shown in similar subsections as the condition A. The fiber reinforced hoses of Examples 11 through 14 shown in Table 3 developed bursting due to yarn breakage after 20,000–50, 000 cycles of impulse tests as shown in the "Test result" subsection. As a result, the relict bursting pressure measurement was replaced with the visual inspection of the breakage surface observation in Examples 11 through 14 and the observation results are shown in the "Yarn breakage surface condition" subsection. These breakage surface conditions matched with the breakage surface conditions of yarns broken down due to abrasions.

Evaluation Results of the Fiber Reinforced Hoses

The following points are notable from the evaluation results of the fiber reinforced hoses of Examples 1 through 14 and Comparative Example 1.

The first point is evident in comparison of Examples 1 through 4 with Comparative Example 1 shown in Table 1. The peeling force (adhesion with the rubber layers) of the fiber reinforced layer of the fiber reinforced hose becomes extremely larger when spanized yarn (single twisted cord) consisting of monofilaments made of para aromatic polyamide is used compared to the case using filament yarn (single twisted cord) made of the same polyamide. Moreover, the difference in the initial bursting pressure (strength of the fiber reinforced layer) between the two cases is very minor.

The second point is evident in comparison of Examples 1 through 4 shown in Table 1 with Examples 11 and 12 shown in Table 3. There is a marked difference between the reinforcing fibers of single twisted cords with twisting multipliers ranging 2–6 and those with twisting multipliers outside of the range 2–6 in terms of the durability against impulse test and the relict bursting pressure. It should be noted that the evaluations of Examples 11 and 12 are made after 50,000 cycles and 20,000 cycles respectively.

The third point is that a similar remark as the second point can be made in the comparisons between Examples 5 through 10 shown in Table 2 and Examples 13 and 14 shown in Table 3. In other words, a relation similar to the second point can be said between the reinforcing fibers of twisted two ply cords with twisting multipliers ranging 2–6 and the reinforcing fibers with twisting multipliers outside of the range 2–6.

The fourth point can be made for the entire range of Examples 5 through 10 (twisted two ply cord) shown in Table 2. As long as the twisting number and the twisting multiplier of the first ply are within certain prescribed ranges, excellent durability against the bursting pressure and the impulse test can be achieved irrespective of the twisting number and the twisting multiplier of the second ply.

The fifth point can be made from the comparison between Examples 5 through 9 and Example 10 shown in Table 2. There is no difference in the durability against the bursting pressure and the impulse test between the reinforcing yarn of the twisted two ply cord with both raw yarns having twisting multipliers ranging 2–6 and the reinforcing yarn of the twisted two ply cord with only one of the raw yarns having a twisting multiplier ranging 2–6. In case of a twisted two ply cord and the like there is provided excellent durability against the bursting pressure and the impulse tests as long as at least one of the raw yarn has a twisting multiplier ranging 2–6.

TABLE 1

|  |  | Example 1 | Example 2 | Example 3 | Example 4 | Comparative Example 1 |
|---|---|---|---|---|---|---|
| Inner diameter × outer diameter (mm) | | φ9 × φ17 | φ9 × φ17 | φ9 × φ17 | φ9 × φ17 | φ9 × φ17 |
| Inner layer/outer layer rubber material | | Acrylic rubber | Acrylic rubber | Acrylic rubber | Acrylic rubber | Acrylic rubber |
| Reinforcing fiber | Yarn type | Para aromatic polyamide spanized | Para aromatic polyamide spanized | Para aromatic polyamide spanized | Para aromatic polyamide spanized | Para aromatic polyamide filament |
| | Denier | 1000 (single twisted cord) | 1000 (single twisted cord) | 1000 (single twisted cord) | 800 (single twisted cord) | 1000 (single twisted cord) |
| | Twist number (turns/m)/twist multiplier — First ply (single twisted cord) | 182/2 | 410/4.5 | 546/6 | 458/4.5 | 91/1 |
| | Second ply (twisted two ply cord) | — | — | — | — | — |
| | Strength (N/fiber) | 242 | 182 | 146 | 147 | 232 |
| | (cN/denier) | 24.2 | 18.2 | 14.6 | 18.4 | 23.2 |
| | Braiding number (fiber) | 32 | 32 | 32 | 32 | 32 |
| Peeling strength (N/25 mm) | | 53 | 52 | 55 | 53 | 18 |
| Initial bursting pressure (MPa) | | 14.4 | 11.0 | 8.5 | 8.4 | 13.5 |
| Impulse test | Condition A Test result | Normal | Normal | Normal | Normal | |
| | Relict bursting pressure after test (MPa) | 10.2 | 11.2 | 7.1 | 8.6 | |
| | Number in parenthesis depicts reduction rate (%) | (−29) | (+2) | (−18) | (+2) | |
| | Condition B Test result | Normal | Normal | Normal | Normal | |
| | Relict bursting pressure after test (MPa) | 6.8 | 11.1 | 5.3 | 8.7 | |
| | Number in parenthesis depicts reduction rate (%) | (−53) | (+1) | (−38) | (+4) | |

TABLE 2

|  |  | Example 5 | Example 6 | Example 7 | Example 8 | Example 9 | Example 10 |
|---|---|---|---|---|---|---|---|
| Inner diameter × outer diameter (mm) | | φ9 × φ17 | φ9 × φ17 | φ9 × φ17 | φ9 × φ17 | φ9 × φ17 | φ9 × φ17 |
| Inner layer/outer layer rubber material | | Acrylic rubber | Acrylic rubber | Acrylic rubber | Acrylic rubber | Acrylic rubber | Acrylic rubber |
| Reinforcing fiber | Yarn type | Para aromatic polyamide spanized | Para aromatic polyamide spanized | Para aromatic polyamide spanized | Para aromatic polyamide spanized | Para aromatic polyamide spanized | Para aromatic polyamide spanized |
| | Denier | 800 (Twisted two ply cord = 400 single twisted cord × 2) | 800 (Twisted two ply cord = 400 single twisted cord × 2) | 800 (Twisted two ply cord = 400 single twisted cord × 2) | 800 (Twisted two ply cord = 400 single twisted cord × 2) | 800 (Twisted two ply cord = 400 single twisted cord × 2) | 800 (Twisted two ply cord = 400 single twisted cord × 2) |
| | Twist number (turns/m)/twist multiplier — First ply (single twisted) | 288/2, 282/2 | 648/4.5, 648/4.5 | 864/6, 864/6 | 648/4.5, 648/4.5 | 648/4.5, 648/4.5 | 144/1, 648/4.5 |
| | Second ply (twisted two ply cord) | 204/2 | 458/4.5 | 610/6 | 204/2 | 610/6 | 458/4.5 |
| | Strength (N/fiber) | 190 | 145 | 117 | 180 | 123 | 161 |
| | (cN/denier) | 23.8 | 18.1 | 14.6 | 22.5 | 15.4 | 20.1 |
| | Braiding number (fiber) | 32 | 32 | 32 | 32 | 32 | 32 |
| Peeling strength (N/25 mm) | | 54 | 52 | 53 | 51 | 53 | 54 |
| Initial bursting pressure (MPa) | | 11.2 | 8.5 | 7.1 | 10.5 | 7.3 | 9.4 |
| Impulse test | Condition A Test result | Normal | Normal | Normal | Normal | Normal | Normal |
| | Relict bursting pressure after test (MPa) | 8.1 | 8.6 | 5.7 | 10.0 | 7.0 | 9.0 |
| | Number in parenthesis depicts reduction rate (%) | (−28) | (+1) | (−20) | (−5) | (−4) | (−4) |
| | Condition B Test result | Normal | Normal | Normal | Normal | Normal | Normal |
| | Relict bursting pressure after test (MPa) | 5.5 | 6.8 | 4.6 | 10.2 | 7.1 | 8.3 |
| | Number in parenthesis depicts reduction rate (%) | (−51) | (+4) | (−35) | (−3) | (−3) | (−12) |

TABLE 3

|  |  | Example 11 | Example 12 | Example 13 | Example 14 |
|---|---|---|---|---|---|
| Inner diameter × outer diameter (mm) | | φ9 × φ17 | φ9 × φ17 | φ9 × φ17 | φ9 × φ17 |
| Inner layer/outer layer rubber material | | Acrylic rubber | Acrylic rubber | Acrylic rubber | Acrylic rubber |
| Reinforcing fiber | Yarn type | Para aromatic polyamide spanized | Para aromatic polyamide spanized | Para aromatic polyamide spanized | Para aromatic polyamide spanized |

TABLE 3-continued

|  |  |  | Example 11 | Example 12 | Example 13 | Example 14 |
|---|---|---|---|---|---|---|
|  | Denier |  | 1000 (single twisted cord) | 1000 (single twisted cord) | 800 (Twisted two ply cord = 400 single twisted cord × 2) | 800 (Twisted two ply cord = 400 single twisted cord × 2) |
|  | Twist number (turns/m)/twist multiplier | First ply (single twisted) | 91/1 | 638/7 | 144/1, 144/1 | 1008/7, 1008/7 |
|  |  | Second ply (twisted two ply cord) | — | — | 102/1 | 713/7 |
|  | Strength | (N/fiber) | 220 | 122 | 175 | 100 |
|  |  | (cN/denier) | 22.0 | 12.2 | 21.9 | 12.5 |
|  | Braiding number (fiber) |  | 32 | 32 | 32 | 32 |
| Peeling strength (N/25 mm) |  |  | 55 | 52 | 52 | 51 |
| Initial bursting pressure (MPa) |  |  | 13.0 | 7.4 | 10.5 | 6.5 |
| Impulse test | Condition A | Test result | Normal | Normal | Normal | Normal |
|  |  | Relict bursting pressure after test (MPa) | 6.3 | 4.9 | 5.2 | 4.5 |
|  |  | Number in parenthesis depicts reduction rate (%) | (−52) | (−34) | (−50) | (−31) |
|  | Condition B | Test result | Burst at 50,000 cycles due to yarn breakage | Burst at 20,000 cycles due to yarn breakage | Burst at 40,000 cycles due to yarn breakage | Burst at 20,000 cycles due to yarn breakage |
|  |  | Yarn breakage surface condition | Matches with surface condition of abrasion breakage | Matches with surface condition of abrasion breakage | Matches with surface condition of abrasion breakage | Matches with surface condition of abrasion breakage |

While the preferred embodiments have been described, variations thereto will occur to skilled in the art within the scope of the present inventive concepts which are delineated by the following claims.

What is claimed is:

1. A flexible fiber reinforced hose comprising:
an inner rubber layer, an outer rubber layer, and a fiber reinforced layer provided between said inner rubber and outer rubber layers, wherein
said fiber reinforced layer is constructed by using a reinforcing fiber of at least one raw yarn, which is a spanized yarn consisting of monofilaments made of a para aromatic polyamide material.

2. A flexible fiber reinforced hose of claim 1, wherein said spanized yarn comprises a large number of monofilaments cut to about 60 cm at arbitrary positions and twisted together.

3. A flexible fiber reinforced hose of claim 1, wherein said reinforcing fiber is a single twisted cord comprising a single raw yarn of said spanized yarn.

4. A flexible fiber reinforced hose of claim 1, wherein said reinforcing fiber is a twisted two ply cord comprising two raw yarns of said spanized yarn.

5. A flexible fiber reinforced hose of claim 1, wherein said reinforcing fiber comprising at least three twisted raw yarns of said spanized yarn.

6. A flexible fiber reinforced hose of claim 1, wherein the raw yarn of said spanized yarn has a twisting multiplier within a range of 2–6.

7. A flexible fiber reinforced hose of claim 1, wherein said reinforcing fiber comprises at least two twisted raw yarns of said spanized yarn; and
at least one of said raw yarns has a twisting multiplier within a range of 2–6 when calculated based on a twisting number of the first ply of said raw yarn.

8. A flexible fiber reinforced hose of claim 1, wherein the monofilament of said raw yarn has a twisting number of 80–1000 turns/m and the raw yarn has a denier of 300–1000.

9. A flexible fiber reinforced hose of claim 1, wherein the raw yarn of said reinforcing fiber has a tensile strength of 14 cN/denier or higher in a tensile test in accordance with JIS L 1013 standard.

10. A flexible fiber reinforced hose of claim 1, wherein the raw yarn of said reinforcing fiber has a tensile strength of 16 cN/denier or higher in a tensile test in accordance with JIS L 1013 standard.

11. A flexible fiber reinforced hose of claim 1, wherein said fiber reinforced layer comprises at least one of spiral wound, braided and knitted reinforcing fibers.

12. A flexible fiber reinforced hose of claim 1, wherein said fiber reinforced layer is sandwiched between an inner rubber layer and an outer rubber layer contacting them directly.

13. A flexible fiber reinforced hose of claim 1, wherein two or more fiber reinforced layers are provided across intermediate rubber layer(s).

14. A flexible fiber reinforced hose of claim 1, wherein at least one of the inner rubber layer and the outer rubber layer of said fiber reinforced hose consists of a single or a plurality of rubber layers.

15. A flexible fiber reinforced hose of claim 1, wherein said fiber reinforced hose further comprises at least one of a resin layer, and a fluid barrier layer comprising at least one of a metal thin film and metal foil lamination layer.

16. A flexible fiber reinforced hose of claim 1, wherein said fiber reinforced hose is at least one of a hose for an air conditioner, an engine cooling hose, a heater hose, an oil hose, and an air hose for an automobile and an industrial machine.

* * * * *